(12) United States Patent
Ryu et al.

(10) Patent No.: US 10,684,069 B2
(45) Date of Patent: Jun. 16, 2020

(54) REFRIGERATOR

(71) Applicant: LG ELECTRONICS INC., Seoul (KR)

(72) Inventors: Inhwan Ryu, Seoul (KR); Minjoo Cha, Seoul (KR); Hyein Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/453,495

(22) Filed: Jun. 26, 2019

(65) Prior Publication Data

US 2019/0316838 A1    Oct. 17, 2019

Related U.S. Application Data

(63) Continuation of application No. 15/792,912, filed on Oct. 25, 2017, now Pat. No. 10,386,116, which is a
(Continued)

(30) Foreign Application Priority Data

Mar. 27, 2013 (KR) .......................... 10-2013-0032525

(51) Int. Cl.
*H04N 7/18* (2006.01)
*F25D 29/00* (2006.01)
(Continued)

(52) U.S. Cl.
CPC ........... *F25D 29/00* (2013.01); *F25D 23/028* (2013.01); *F25D 23/04* (2013.01); *F25D 23/062* (2013.01);
(Continued)

(58) Field of Classification Search
CPC ........ F25D 29/00; F25D 23/028; F25D 23/04; F25D 23/062; F25D 2400/06;
(Continued)

(56) References Cited

U.S. PATENT DOCUMENTS 9,285,162 B2    3/2016  Ryu et al.
9,503,635 B2    11/2016 Ryu
(Continued)

FOREIGN PATENT DOCUMENTS

JP    2001-317858    11/2001
JP    2002-243335    8/2002
(Continued)

OTHER PUBLICATIONS

European Search Report dated Jul. 22, 2014, issued in Application No. 14152587.3.
(Continued)

*Primary Examiner* — Eileen M Adams
(74) *Attorney, Agent, or Firm* — KED & Associates LLP

(57) ABSTRACT

A refrigerator is provided. The refrigerator may include a main body having a storage compartment, a first door rotatably installed at a first side of the main body to open and close a first portion of the storage compartment, and a second door rotatably installed at a second side of the main body to open and close a second portion of the storage compartment. A first camera may be installed at the first door to take a picture of an interior of the first storage compartment during rotation of the first door, and a second camera may be installed at the second door to take a picture of the interior of the first storage compartment during rotation of the second door. A controller may combine plural pictures taken by the first camera and the second camera into a single corrected image of a region of the first compartment spanning from the first door to the second door.

14 Claims, 18 Drawing Sheets

Related U.S. Application Data continuation of application No. 15/298,520, filed on Oct. 20, 2016, now Pat. No. 9,829,243, which is a continuation of application No. 15/040,333, filed on Feb. 10, 2016, now Pat. No. 9,503,635, which is a continuation of application No. 14/190,450, filed on Feb. 26, 2014, now Pat. No. 9,285,162.

(51) Int. Cl.
| | | |
|---|---|---|
| *H04N 5/225* | (2006.01) | |
| *F25D 23/02* | (2006.01) | |
| *F25D 23/06* | (2006.01) | |
| *G06Q 10/08* | (2012.01) | |
| *G06T 11/60* | (2006.01) | |
| *H04N 5/232* | (2006.01) | |
| *F25D 23/04* | (2006.01) | |

(52) U.S. Cl.
CPC ............ *G06Q 10/087* (2013.01); *G06T 11/60* (2013.01); *H04N 5/2252* (2013.01); *H04N 5/23222* (2013.01); *H04N 7/181* (2013.01); *F25D 2400/06* (2013.01); *F25D 2500/06* (2013.01); *F25D 2600/00* (2013.01); *F25D 2700/02* (2013.01); *F25D 2700/06* (2013.01); *F25D 2700/08* (2013.01)

(58) Field of Classification Search
CPC ............. F25D 2500/06; F25D 2600/00; F25D 2700/02; F25D 2700/06; F25D 2700/08; G06Q 10/087; G06T 11/60; H04N 5/2252; H04N 5/23222; H04N 7/181
See application file for complete search history.

(56) References Cited

U.S. PATENT DOCUMENTS

| | | |
|---|---|---|
| 2002/0066279 A1 | 6/2002 | Kiyomatsu |
| 2003/0164754 A1 | 9/2003 | Roseen |
| 2006/0096303 A1 | 5/2006 | Kavounas |
| 2010/0170289 A1 | 7/2010 | Graziano |
| 2011/0266275 A1 | 11/2011 | Rateiczak |
| 2012/0285089 A1 | 11/2012 | Artwohl |
| 2013/0056477 A1 | 3/2013 | Go |
| 2014/0168396 A1 | 6/2014 | Kempiak et al. |

FOREIGN PATENT DOCUMENTS

| | | |
|---|---|---|
| JP | 2003-004366 | 1/2003 |
| JP | 2003-090661 | 3/2003 |
| JP | 2003-207258 | 7/2003 |
| JP | 2004-183987 | 7/2004 |
| JP | 2004-286355 | 10/2004 |
| JP | 2006-084132 | 3/2006 |
| KR | 10-2006-0099985 | 9/2006 |
| KR | 10-2010-0059621 | 6/2014 |

OTHER PUBLICATIONS

Notice of Allowance dated Nov. 6, 2015 issued in U.S. Appl. No. 14/190,450.
Office Action dated Mar. 24, 2016 issued in U.S. Appl. No. 15/040,333.
Notice of Allowance dated Jul. 22, 2016 issued in U.S. Appl. No. 15/040,333.
Chinese Office Action dated Jan. 11, 2017 issued in Application 201410119615.6 (English Translation).
Office Action dated Dec. 1, 2016 issued in U.S. Appl. No. 15/298,520.
Notice of Allowance dated Jul. 25, 2017 issued in U.S. Appl. No. 15/298,520.
Final Office Action dated Jul. 20, 2018 issued in parent U.S. Appl. No. 15/792,912.
Korean Notice of Allowance dated Apr. 15, 2019 issued in Application 10-2013-0032525.
Korean Office Action dated Apr. 1, 2020 issued in Application 10-2020-0010447.

REFRIGERATOR

CROSS-REFERENCE TO RELATED APPLICATIONS

This application is a Continuation Application of U.S. patent application Ser. No. 15/792,912 filed Oct. 25, 2017, which is a Continuation Application of U.S. patent application Ser. No. 15/298,520, filed Oct. 20, 2016, now U.S. Pat. No. 9,829,243 which is a Continuation Application of U.S. patent application Ser. No. 15/040,333, filed Feb. 10, 2016, now U.S. Pat. No. 9,503,635, which is a Continuation Application of U.S. application Ser. No. 14/190,450, filed Feb. 26, 2014, now U.S. Pat. No. 9,285,162, which claims priority under 35 U.S.C. § 119 to Korean Application 10-2013-0032525 filed in Korea on Mar. 27, 2013, whose entire disclosures are hereby incorporated by reference

BACKGROUND

1. Field

This relates to a refrigerator, and more particularly to a refrigerator which may provide information related to items stored therein.

2. Background

A refrigerator may supply cold air generated via driving of a refrigeration cycle to store items in a low temperature state. A user may open a door of the refrigerator in order to view an interior of the refrigerator and contents of the interior of the refrigerator. Not knowing quantities and types of items stored in the refrigerator may cause inconvenience when purchasing replenishment items.

BRIEF DESCRIPTION OF THE DRAWINGS

The embodiments will be described in detail with reference to the following drawings in which like reference numerals refer to like elements wherein.

DETAILED DESCRIPTION

Figure 1:
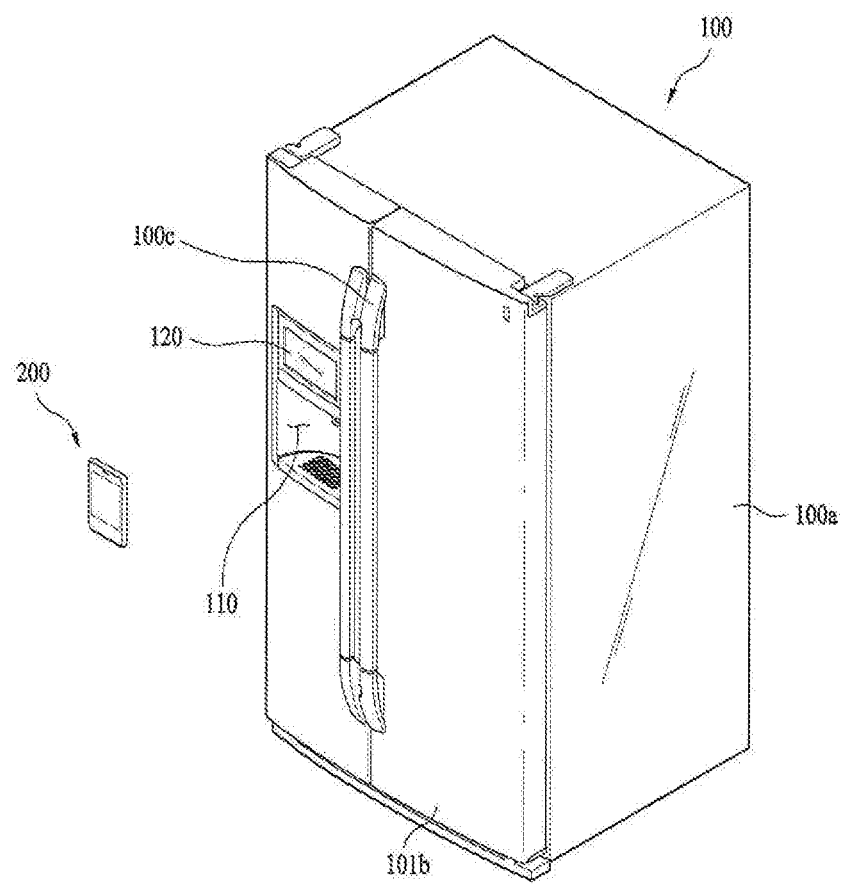
FIG. 1 is a perspective view of a refrigerator in accordance with an embodiment as broadly described herein.

Hereinafter, exemplary embodiments will be described with reference to the accompanying drawings. In the drawings, the shape, size, and the like of components may be exaggerated for clarity and convenience. In addition, the terms particularly defined in consideration of configurations and operations of embodiments as broadly described herein may be replaced by other terms by those skilled in the art. The meanings of these terms may be construed based on the overall content as broadly described herein.

In a refrigerator as embodied and broadly described herein, a camera may be installed at or near a door that is a movable component of the refrigerator, whereby information related to the interior of a storage compartment of the refrigerator may be acquired via the camera. That is, although the interior of the storage compartment is in a stationary state, the camera may be moved along with the door, and thus a region that may be imaged by the camera is variable. As a result, pictures of various positions in the interior of the storage compartment may be acquired via a single camera.

As shown in FIG. 1, a refrigerator 100 as embodied and broadly described herein may include a main body 100a, a door 101b coupled at a front surface of the main body 100a, and a handle 100c mounted on the door 101b. A dispenser 110 that dispenses cold water or ice may be provided on the door 101b, and a display 120 that provides the user with various information related to, e.g., food stored in the refrigerator 100, may also be provided on the door 101b. The display 120 may also transmit user input information to other devices.

The display 120 may have various forms so long as it may display prescribed information and enable touch input of a prescribed instruction. In one example, the display 120 may take the form of a touchscreen that may provide for simultaneous input and display. The display 120 may be separably coupled to a front surface of the door 101b. Thus, the user may attach or detach the display 120 to or from the refrigerator 100 as needed.

Information displayed on the display 120 may be transmitted to a terminal 200 that is connected to the refrigerator 100 through a network. The terminal 200 may be, for example, a smart-phone that is independent of the refrigerator 100 to allow the user to have the terminal 200 remote from the refrigerator 100. Accordingly, a user viewing the terminal 200 may recognize information related to the interior of the refrigerator 100 even if the user does not have physical access to the refrigerator 100.

Figure 2:
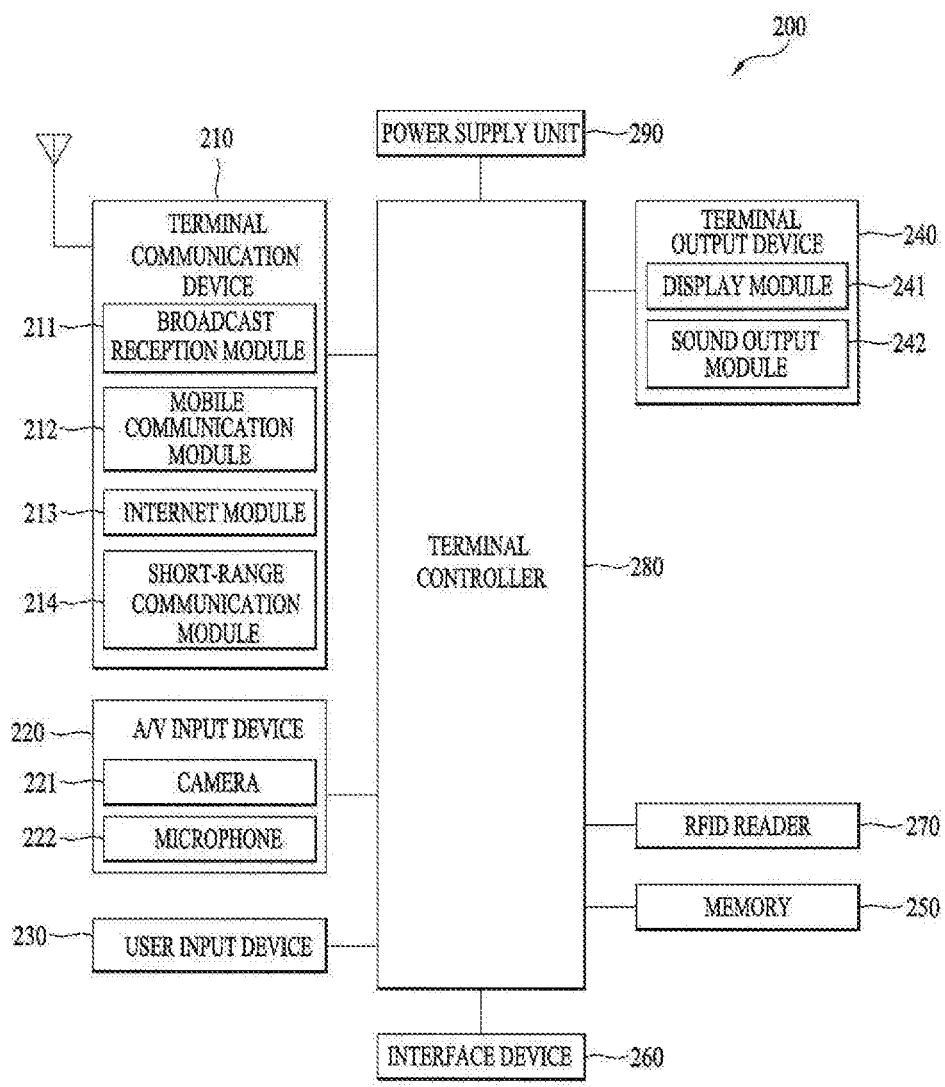
FIG. 2 is a block diagram of a terminal, in accordance with an embodiment as broadly described herein.

With reference to FIG. 2, a terminal 200 as embodied and broadly described herein may include a terminal communication device 210, an Audio/Video (NV) input device 220, a user input device 230, a terminal output device 240, a memory 250, an interface device 260, a Radio Frequency Identification (RFID) reader 270, a terminal controller 280, and a power supply device 290, for example. Not all of the components shown in FIG. 2 are essential, and the terminal 200 may include a greater or lesser number of components.

The terminal communication device 210 may include one or more modules to enable use of the Internet between the terminal 200 and a wireless communication system or in an Internet protocol network in which the terminal 200 is located. For example, the terminal communication device 210 may include a broadcast reception module 211, a mobile communication module 212, an Internet module 213, and a short-range communication module 214.

The broadcast reception module 211 may receive broadcast signals and/or broadcast information from an external broadcast management server through a broadcast channel under control of the terminal controller 280, and may play back the same on a display module 241.

The mobile communication module 212 may transmit/receive wireless signals with at least one of a base station, an external terminal, or a server through a mobile communication network. The wireless signals may include voice signals, video call signals, or various other data based on transmission/reception of text/multimedia messages.

The Internet module 213 may provide for wired/wireless Internet connection. Wireless Internet technologies may include Wireless LAN (WLAN) (Wi-Fi), wireless broadband (WiBro), World Interoperability for Microwave Access (WiMAX), High Speed Downlink Packet Access (HSDPA), and the like.

The short-range communication module 214 may provide for short-range communication. Short-range communication technologies may include Bluetooth, Radio Frequency Identification (RFID), Infrared Data Association (IrDA), Ultra Wideband (UWB), ZigBee, and the like.

The A/V input device 220 may receive audio signals and video signals, and may include a camera module 221 and a microphone 222, for example.

The camera module 221 may process image information including, e.g. a still image or a moving image captured by an image sensor in a video call mode or an image capture mode. The processed image information may be displayed on the display module 241. Image data processed in the camera module 221 may be stored in the memory 250, or may be transmitted to, e.g., an external terminal through the terminal communication device 210. Two or more camera modules 221 may be provided, depending on a particular usage environment.

The microphone 222 may receive an external sound signal, e.g., in a call mode, a recording mode or a voice recognition mode, and may process the sound signal into electrical voice data.

The user input device 230 may receive input data to allow the user to control operation of the terminal 200. The user input device 230 may include a keypad, a direction key, a dome switch, a touchpad (constant-pressure/capacitive), a jog wheel, a jog switch, and the like.

The terminal output device 240 may generate visual or auditory output, and may include the display module 241 and a sound output module 242, for example.

The display module 241 may display (output) information processed in the terminal 200. For example, when displaying information related to the terminal 200 and the refrigerator 100, the display module 241 of the terminal 200 may display the interior state of the refrigerator 100. The display module 241 may include at least one of a Liquid Crystal Display (LCD), a Thin Film Transistor Liquid Crystal Display (TFT LCD), an Organic Light Emitting Diode (OLED), a flexible display, and a 3D display.

In certain embodiments, the display module 241 may include a sensor to sense a touch motion (hereinafter referred to as 'a touch sensor') constructed in a layered structure (hereinafter referred to as 'a touchscreen'), so that the display module 241 may be used as an input device as well as an output device.

The touch sensor may take the form of a touch film, a touch sheet, or a touch pad, for example. The touch sensor may be configured to convert, e.g., a pressure applied to a specific portion of the display module 241 or a variation of capacitance generated from the specific portion of the display module 241 into an electrical input signal. The touch sensor may be configured to detect a touch pressure applied to the display module 241 as well as a touched location and an area of the touched location.

When a touch input is generated with respect to the touch sensor, the signal(s) corresponding to the touch input may be transmitted to a touch controller which processes the signal(s), and transmits data corresponding to the signal(s) to the terminal controller 280. In this manner, the terminal controller 280 may recognize a touch to a particular region of the display module 241.

The sound output module 242 may output data containing audio stored in the memory 250, or may output sound informing the user of an operational state of the refrigerator 100. The sound output module 242 may include, for example, a receiver, a speaker, or a buzzer.

The memory 250 may store a program for processing and control of the terminal controller 280, and may contain information related to food stored in the refrigerator 100. In addition, the memory 250 may store graphic data to provide the user with various messages and information via various visual effects.

The above-described memory 250 may include a storage medium having at least one type among a flash memory type, a hard disk type, a multimedia card micro type, a card type of a memory (for example, an SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disc, and an optical disc.

The interface device 260 may connect various external devices to the refrigerator terminal 200. The interface device 260 may receive data or power from an external device, and transfer the data or power to each component in the terminal 200, or transmit internal data of the terminal 200 to an external device. For example, the interface device 260 may include a wired/wireless headset port, an external charger port, a wired/wireless data port, a memory card port, a port for connection of a device having an identification module, an audio Input/Output (I/O) port, a video I/O port, and an earphone port.

The terminal controller 280 may control an overall operation of the terminal 200.

The power supply 290 may receive power from an external power source through the interface device 260 and may supply the power to operate each component under control of the terminal controller 280.

Various exemplary embodiments described herein may be implemented in a recording medium capable of being read by a computer or a similar device using, e.g., software, hardware, or a combination thereof.

According to hardware implementation, exemplary embodiments described herein may be realized using at least one of Application Specific Integrated Circuits (ASICs), digital signal processors (DSPs), digital signal processing devices (DSPDs), programmable logic devices (PLDs), field programmable gate arrays (FPGAs), processors, controllers, micro-controllers, microprocessors, and an electric unit for performing other functions.

In some cases, exemplary embodiments described in the specification may be implemented by the terminal controller 280.

According to software implementation, exemplary embodiments with regard to procedures and functions described in the specification may be realized by separate software modules. Each of the software modules may perform at least one function and operation described in the specification.

Software code may be embodied as a software application that is written in an appropriate programming language. The software code may be stored in the memory 250, and may be executed by the terminal controller 280.

Figure 3:
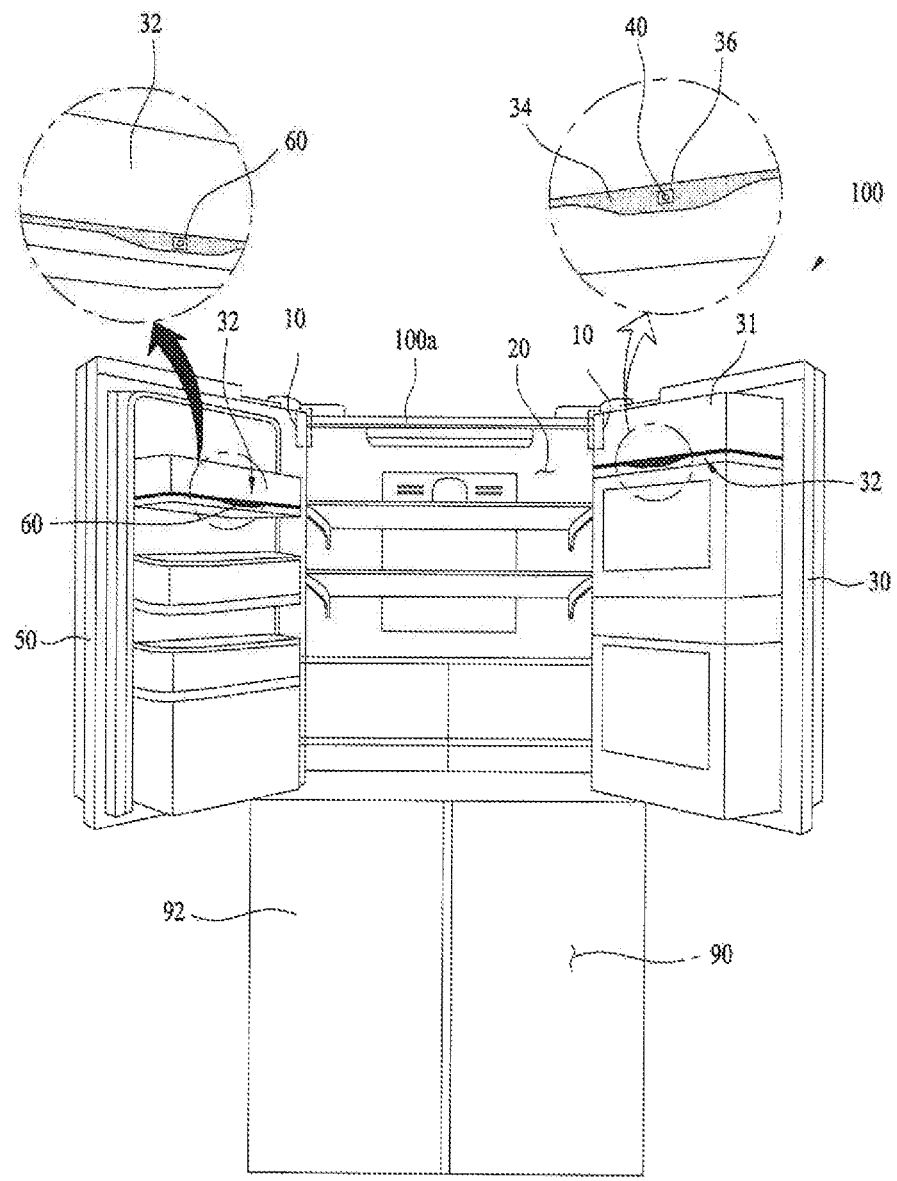
FIG. 3 is a front view of a refrigerator, in accordance with an embodiment as broadly described herein.

As shown in FIG. 3, a refrigerator 100 according to one embodiment may have a first storage compartment 20 and a second storage compartment 90 in which items may be stored, a right door 30 installed at a right side of the main body 100*a*, and a left door 50 installed at a left side of the main body 100*a*, both the right and left doors 30 and 50 opening and closing the first storage compartment 20.

The right door 30 may be pivotally rotated about the right side of the first storage compartment 20 to open and close a corresponding portion of the first storage compartment 20, and the left door 50 may be pivotally rotated about the left side of the first storage compartment 20 to open and close a corresponding portion of the first storage compartment 20. The user may fully open the first storage compartment 20 by pivotally rotating both the right door 30 and the left door 50 to check, e.g., a type and quantity of food stored in the first storage compartment 20 and to access the food.

According to one embodiment, the refrigerator 100 may include a first camera 40 installed at the right door 30 and a second camera 60 installed at the left door 50.

Among the various components of a refrigerator, a door is a movable component. In this exemplary embodiment, the door may open or close a storage compartment by being rotated about a single rotation axis. The door has a prescribed trajectory through this rotation, and therefore has less possibility of abnormal movement.

In the present embodiment, the first camera 40 may be installed at an inner surface of the right door 30, i.e. a surface of the right door 30 facing the first storage compartment 20. Similarly, the second camera 60 may be installed at an inner surface of the left door 50, i.e. a surface of the left door 50 facing the first storage compartment 20. Since the first camera 40 and the second camera 60 are installed respectively on the right door 30 and the left door 50, the first camera 40 and the second camera 60 are pivotally rotated when the right door 30 and the left door 50 are pivotally rotated relative to the main body 100*a*. As the first camera 40 and/or the second camera 60 rotates with the respective door in this manner, the first camera 40 and the second camera 60 may take pictures plural times, thereby acquiring a plurality of pictures of the interior of the refrigerator 100.

More specifically, the first camera 40 and the second camera 60 may be installed on racks 32 on which food is received. In certain embodiments, a cover 31 may enclose the top of the rack 32 so as to isolate food on the rack 32 from the interior of the first storage compartment 20. The cover 31 may, for example, rotate about one side of the rack 32 to provide access to food received inside the cover 31, on the rack 32.

The rack 32 may include a decorative portion 34 at a front surface thereof. The decorative portion 34 may be formed of an opaque material, and a transparent window 36 may be provided at the decorative portion 34 to allow the first camera 40 or the second camera 60 to take a picture through the transparent window 36.

To drive the first camera 40 or the second camera 60, an electric wire for transmission of power and a control signal may be necessary. Accordingly, the decorative portion 34 may be formed of an opaque material so that the interior of the rack 32 is not visible. That is, the decorative portion 34 may ensure that the electric wire extending from the main body 100*a* to the first camera 40 or the second camera 60 is connected to the rack 32 without being exposed and visible to the user. As the first camera 40 or the second camera 60 is installed to take a picture through the transparent window 36, distortion due to the decorative portion 34 may be avoided.

Although FIG. 3 shows a state in which each of the first camera 40 and the second camera 60 is installed on a single rack 32 of each door 30 and 50, the first camera 40 and/or the second camera 60 may be installed on a plurality of racks of each door 30 and/or 50. More specifically, each of the right door 30 and the left door 50 includes a plurality of racks 32, and therefore a plurality of first cameras 40 and second cameras 60 may be provided at each door 30 and 50.

The plurality of racks 32 installed within the first storage compartment 20 may be full of food. Therefore, providing the plurality of first cameras 40 and/or second cameras 60 may allow the first cameras 40 and/or the second cameras 60 to take pictures at various heights, which may ensure more clear transmission of information related to the stored food in the refrigerator 100.

In addition, in the case in which the plurality of first cameras 40 and/or second cameras 60 is provided, the first cameras 40 and/or the second cameras 60 may be aligned in a single line. In this case, the single line may extend in a vertical direction confronting the main body 100*a*.

In certain embodiments, the first camera 40 and the second camera 60 may be installed at different heights. The right door 30 and the left door 50 may respectively include the racks 32 installed at different heights. Accordingly, to ensure that the first camera 40 and the second camera 60 installed at different heights take desired pictures, an installation direction or a zoom-in or zoom-out function of each camera 40 and 60 may be controlled.

According to one embodiment, the first storage compartment 20 and the second storage compartment 90 may define separate storage spaces. That is, the first storage compartment 20 and the second storage compartment 90 may be opened and closed by different doors.

If the first storage compartment 20 is a refrigerating compartment, the second storage compartment 90 may be a freezing compartment. On the contrary, if the first storage compartment 20 is a freezing compartment, the second storage compartment 90 may be a refrigerating compartment. Alternatively, if the first storage compartment 20 and the second storage compartment 90 define separate spaces, both the first storage compartment 20 and the second storage compartment 90 may equally serve as refrigerating compartments or freezing compartments.

Each of the right door 30 and the left door 50 may include a door rotation drive device 10 configured to open and close the first storage compartment 20. That is, two door rotation drive devices 10 may be provided to rotate the right door 30 and the left door 50, respectively.

The first storage compartment 20 may be open as one or both of the door rotation drive devices 10 rotates the right door 30 and/or the left door 50 in a specific direction. On the other hand, the first storage compartment 20 may be closed as each of the door rotation drive devices 10 rotates the right door 30 and/or the left door 50 for the in an opposite direction.

Figure 4:
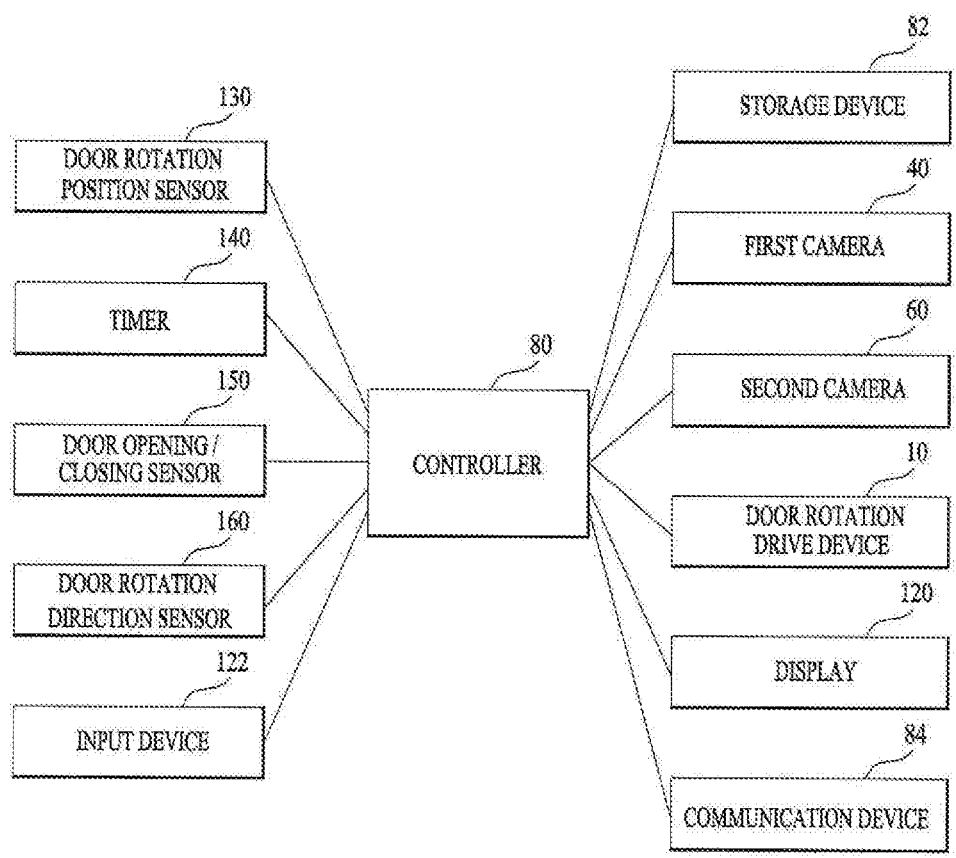
FIG. 4 is a control block diagram for the refrigerator shown in FIG. 3.

FIG. 4 is a control block diagram associated with the refrigerator shown in FIG. 3.

A controller 80 may combine a plurality of pictures taken by the first camera 40 and the second camera 60 with one another, and may correct the pictures into a single image of an interior region of the first storage compartment 20, from the right door 30 to the left door 50. The controller 80 may combine a plurality of pictures taken by the first camera 40 and the second camera 60, thereby providing the user with an image that the user may easily and intuitively recognize. The controller 80 may combine the plurality of pictures with one another, and correct the respective pictures. Alternatively, combination of the plurality of pictures may be implemented by an external control device provided external to the refrigerator 100, rather than being implemented by the controller 80.

According to one embodiment of the present invention, a door rotation position sensor 130 may be provided to sense a rotation position of the right door 30 and/or a rotation position of the left door 50. The door rotation position sensor 130 may be integrated with the door rotation drive device 10, and may sense whether or not the right door 30 and/or the left door 50 for the first storage compartment reaches a predetermined rotation position.

When the right door 30 and/or the left door 50 for the first storage compartment reaches a predetermined rotation position, the door rotation position sensor 130 may transmit a related signal to the controller 80 to instruct the first camera 40 and/or the second camera 60 to take a picture.

In certain embodiments, a plurality of rotation positions may be predetermined with respect to each of the right door 30 and the left door 50. This allows the first camera 40 and the second camera 60 to take pictures plural times.

The door rotation position sensor 130 may include a Hall sensor using Hall effects. The Hall sensor may find the magnitude and direction of a magnetic field using Hall effects in which a potential difference is produced across a conductor carrying an electric current when a magnetic field is applied in a direction perpendicular to that of the current flow.

According to one embodiment, a timer 140 may measure passage of time. In addition to general passage of time, the timer 140 may measure, in particular, moving time of the right door 30 and/or the left door 50. When moving time measured by the timer 140 exceeds a predetermined time, the timer 140 may transmit a related signal to the controller 80 to allow the controller 80 to instruct the first camera 40 and/or the second camera 60 to take a picture.

According to one embodiment, a door opening/closing sensor 150 may sense opening or closing of the right door 30 and/or the left door 50. The door opening/closing sensor 150 may sense whether or not the right door 30 and/or the left door 50 is released from contact with the main body 100a, for example, thereby sensing whether the right door 30 and/or the left door 50 opens or closes the first storage compartment 20. The door opening/closing sensor 150 may transmit information related to opening or closing of the right door 30 and/or the left door 50 to the controller 80.

According to one embodiment, a door rotation direction sensor 160 may sense a rotation direction of the right door 30 and/or a rotation direction of the left door 50. The door rotation direction sensor 160 may include a plurality of Hall sensors to sense a rotation position of the right door 30 and/or the left door 50 based on a position of the sequentially affected hall sensors.

The door rotation direction sensor 160 may sense a rotation direction of the right door 30 and/or the left door 50, and transmit a related signal to the controller 80. That is, the controller 80 may detect a rotation direction of the right door 30 and/or the left door 50 with assistance from the door rotation direction sensor 160.

When each of the right door 30 and the left door 50 is rotated in a specific direction, the controller 80 may determine that each of the right door 30 and the left door 50 is rotated to open the first storage compartment 20. On the other hand, when each of the right door 30 and the left door 50 is rotated in a direction opposite to the specific direction, the controller 80 may determine that each of the right door 30 and the left door 50 is rotated to close the first storage compartment 20.

According to one embodiment, a storage device 82 may be provided to store an image corrected by the controller 80. The storage device 82 may store all images corrected by the controller 80 including the most recently corrected image as well as previously corrected images. The image(s) stored in the storage device 82 may be transmitted to the terminal 200 or the display 120, and the user may recognize information related to the interior of the refrigerator 100 via the terminal 200 or the display 120.

According to one embodiment, the door rotation drive device 10 may drive the right door 30 and/or the left door 50. For example, the door rotation drive device 10 may be driven in response to a signal input by the user via the input device 122, thereby opening or closing the right door 30 and/or the left door 50, depending on the input and corresponding signal. That is, the door rotation drive device 10 may open or close the first storage compartment 20 by rotating the right door 30 and/or the left door 50 forward or in reverse.

The door rotation drive device 10 may include a stepper motor which may be rotated by an angle proportional to a given pulse number based on the sequence of step pulses. That is, a rotation angle of the right door 30 and/or the left door 50 may be precisely controlled by applying a predetermined pulse to the stepper motor.

Through use of the door rotation drive device 10 including the stepper motor, the door rotation drive device 10 may sense a rotation direction and a rotation position of the right door 30 and/or the left door 50. That is, through use of the door rotation drive device 10 including the stepper motor, the door rotation position sensor 130 and the door rotation direction sensor 160 of FIG. 4 may be omitted.

According to one embodiment, a communication device 84 may be provided to transmit an image corrected by the controller 80 to an external device. In this case, the communication device 84 may transmit a corrected image to the terminal communication device 210 as shown in FIG. 2. In particular, the communication device 84 may transmit, e.g., an image stored in the storage device 82 or an image corrected by the controller 80 to an external device provided outside of the refrigerator 100.

Figure 5:
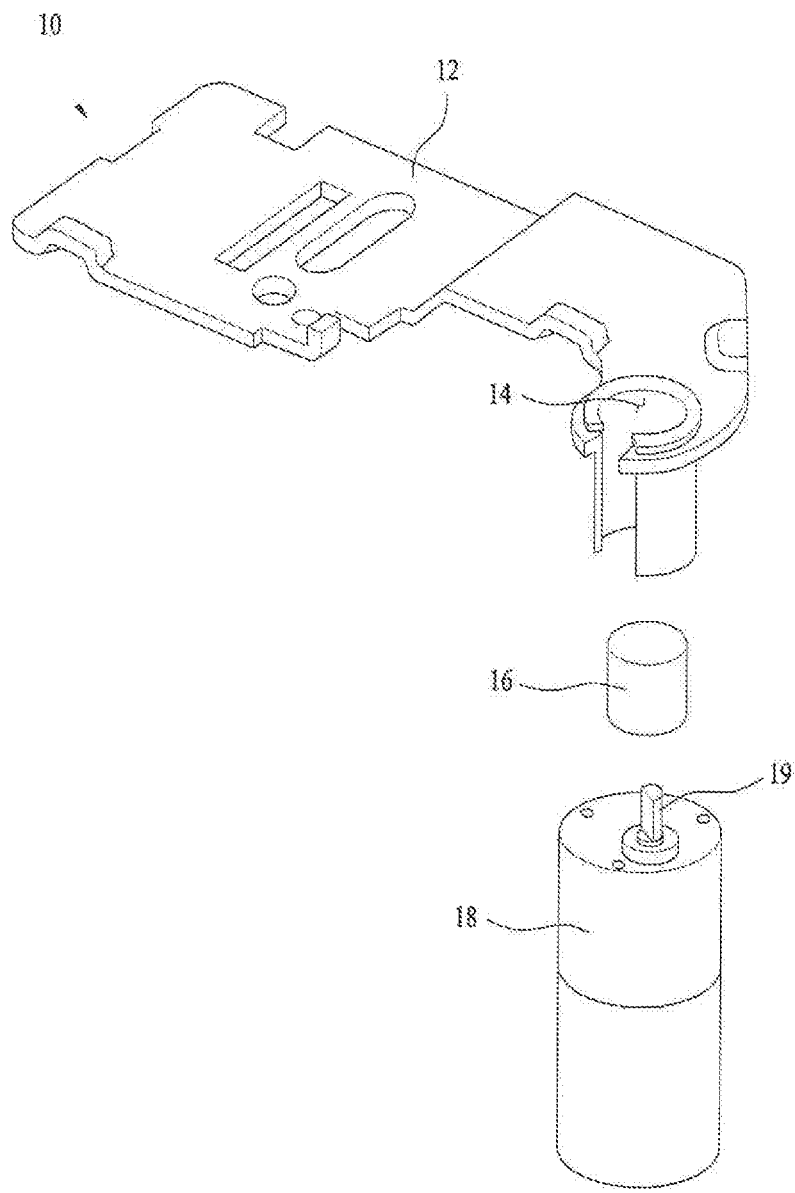
FIG. 5 is an exploded perspective view of a door rotation drive device of the refrigerator shown in FIG. 3.

FIG. 5 is an exploded perspective view of the door rotation drive device shown in FIG. 3.

The door rotation drive device 10 may include a bracket 12, one side of which is coupled to the main body 100*a*, and a motor 18 connected to the bracket 12.

The motor 18 may be embedded in the door 30, 50 and may be mounted at the center of rotation, about which the door 30, 50 is rotated relative to the main body 100*a*. As such, the motor 18 may be rotated along with the door 30, 50.

The bracket 12 may have a cylindrical receiving groove 14, and a link crank 16 may be received in the receiving groove 14. A rotating shaft 19 of the motor 18 may be inserted into the link crank 16. The link crank 16 may be fixed in the receiving groove 14 so that it is not rotatable relative to the receiving groove 14. Since the bracket 12 is fixed to the main body 100*a*, consequently, the link crank 16 is fixed to the main body 100*a*, and thus is not rotated relative to the main body 100*a*. That is, since the link crank 16 is kept stationary even if the rotating shaft 19 of the motor 18 is rotated, the motor 18 is rotated, and consequently the door 30, 50 is rotated. The motor 18 may be a stepper motor. That is, the motor 18 may rotate the right door 30 and/or the left door 50 by a predetermined angle, thereby controlling an opening degree of the first storage compartment 20.

Figure 6:
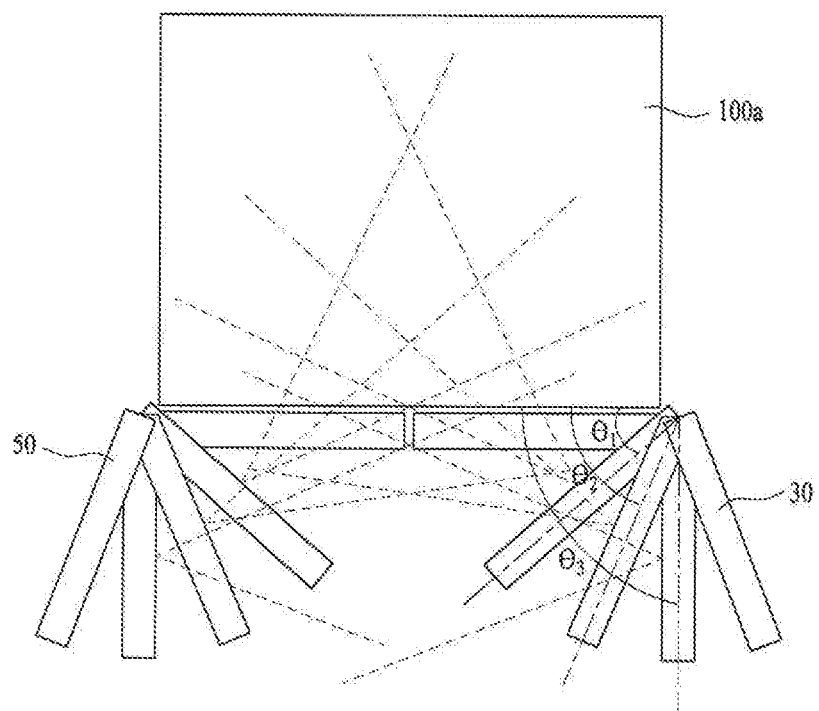
FIG. 6 is a schematic view of rotation of one or more doors of the refrigerator shown in FIG. 3.

As shown in FIG. 6, the right door 30 and/or the left door 50 is pivotally rotatable relative to the main body 100*a*, and the first camera 40 and/or the second camera 60 may take pictures a plurality of times as the doors 30, 50 rotate.

As shown in FIG. 6, a region imaged by the first camera 40 and/or the second camera 60 may vary as the right door 30 and/or the left door 50 is rotated. However, since the right door 30 and the left door 50 both rotate about a vertical axis of the main body 100*a*, each of the first camera 40 and the second camera 60 has a constant picture taking height even if the doors 30, 50 are rotated.

The first camera 40 may take a picture one or more times when the right door 30 is rotated relative to the main body 100*a* by an angle less than 90 degrees. This is because the first camera 40 may take a picture of the interior of the first storage compartment 20 or the interior of the left door 50 when the right door 30 is rotated relative to the main body 100*a* by an angle less than 90 degrees.

For example, the first camera 40 may take pictures when the right door 30 is rotated relative to the main body 100*a* by angles of, for example, 40 degrees, 65 degrees, and 90 degrees. At these positions of the right door 30, the first camera 40 may take a picture of a region of the first storage compartment 20 proximate to the left door 50 and a picture of the interior of the left door 50.

The second camera 60 may take a picture one or more times when the left door 50 is rotated relative to the main body 100*a* by an angle less than 90 degrees. This is because the second camera 60 may take a picture of the interior of the first storage compartment 20 or the interior of the right door 30 when the left door 50 is rotated relative to the main body 100*a* by an angle less than 90 degrees.

In particular, the second camera 60 may take pictures when the left door 50 is rotated relative to the main body 100*a* by angles of, for example, 40 degrees, 65 degrees, and 90 degrees. At these positions of the left door 50, the second camera 60 may take a picture of a region of the first storage compartment 20 proximate to the right door 30 and a picture of the interior of the right door 30.

Although each of the first camera 40 and the second camera 60 is fixed to its respective door 30, 50, the first camera 40 and the second camera 60 may take pictures of various regions because the right door 30 and the left door 50 are rotated. That is, it is possible to take pictures of several regions in which food is stored in the first storage compartment using the single first camera 40 and the single second camera 60.

In addition, the first camera 40 and the second camera 60 may take a plurality of pictures based on a rotation duration of the right door 30 and the left door 50.

More specifically, the opening of the right door 30 and the left door 50 may be sensed by the door opening/closing sensor 150. Then, when a prescribed time has elapsed after the door opening/closing sensor 150 senses opening of the right door 30 and/or the left door 50, the first camera 40 and the second camera 60 may take a picture.

In this case, the right door 30 and the left door 50 may be pivotally rotated by the door rotation drive device 10. That is, the door rotation drive device 10, which is driven by the motor 18, may have a predetermined angular velocity, and the first camera 40 and the second camera 60 may take pictures at desired positions based on a time interval measured by the timer 140.

The time interval measured by the timer 140 may be set in such a manner that a rotation angle of the right door 30 and/or the left door 50 with respect to the main body 100*a* is approximately 40 degrees, 65 degrees, and 90 degrees. That is, when the right door 30 and/or the left door 50 is rotated by the door rotation drive device 10, the timer 140 may set a point in time when each of the first camera 40 and the second camera 60 takes a picture.

When the door opening/closing sensor 150 senses opening of the right door 30 or the left door 50, the first camera 40 and the second camera 60 take a picture as the right door 30 and/or the left door 50 opens the first storage compartment 20. In this case, the first camera 40 and the second camera 60 may take pictures at door rotation angles of, for example, 40 degrees, 65 degrees, and 90 degrees in sequence.

In the above-described case, the door rotation direction sensor 160 may sense whether or not the right door 30 and/or the left door 50 is rotated in a direction to open the first storage compartment 20 based on a rotation direction of the right door 30 and/or the left door 50.

Alternatively, the first camera 40 and the second camera 60 may take a picture when the right door 30 and/or the left door 50 is rotated in a direction to close the first storage compartment 20.

Typically, the user opens the right door 30 and/or the left door 50, introduces food into or retrieves food from the first storage compartment 20, the right door 30 or the left door 50, and then closes the right door 30 and/or the left door 50. That is, the latest information related to food stored in the first storage compartment 20, the right door 30 and/or the left door 50 may be acquired when the user closes the right door 30 and/or the left door 50.

If information related to food received in the first storage compartment 20, the right door 30 and/or the left door 50 is acquired when the right door 30 and the left door 50 is first opened, there is high likelihood of the corresponding information being changed.

In contrast, in the present embodiment, as the door rotation direction sensor 160 senses that the right door 30 and/or the left door 50 is rotated to close the first storage compartment 20, the first camera 40 and/or the second camera 60 may take a picture.

The door rotation direction sensor 160 may allow the first camera 40 and the second camera 60 to take pictures at the door rotation angles of, for example, 90 degrees, 65 degrees, and 40 degrees in sequence when the right door 30 and/or the left door 50 is rotated to close the first storage compartment 20. In this case, the first camera 40 and the second camera 60 takes pictures in a sequence opposite to the sequence of taking pictures when the doors 30, 50 are rotated to open the first storage compartment 20.

Even when the right door 30 and/or the left door 50 is rotated in a direction to close the first storage compartment 20, the timer 140 may begin to measure time when doors 30, 50 are at an angle of 90 degrees with respect to the main body 100*a*.

After a prescribed time has passed from time when the doors 30, 50 are at an angle of 90 degrees with respect to the main body 100*a*, it may be determined that the right door 30 and/or the left door 50 is at an angle of 65 degrees or 40 degrees, and at this time the first camera 40 and/or the second camera 60 may take a picture. In this case, the right door 30 and/or the left door 50 may be rotated at a constant angular velocity by the door rotation drive device 10. That is, when the right door 30 and/or the left door 50 is rotated at a constant angular velocity, a rotation angle of the right door 30 and/or the left door 50 may be easily determined based on a time measured by the timer 140.

Figure 7:
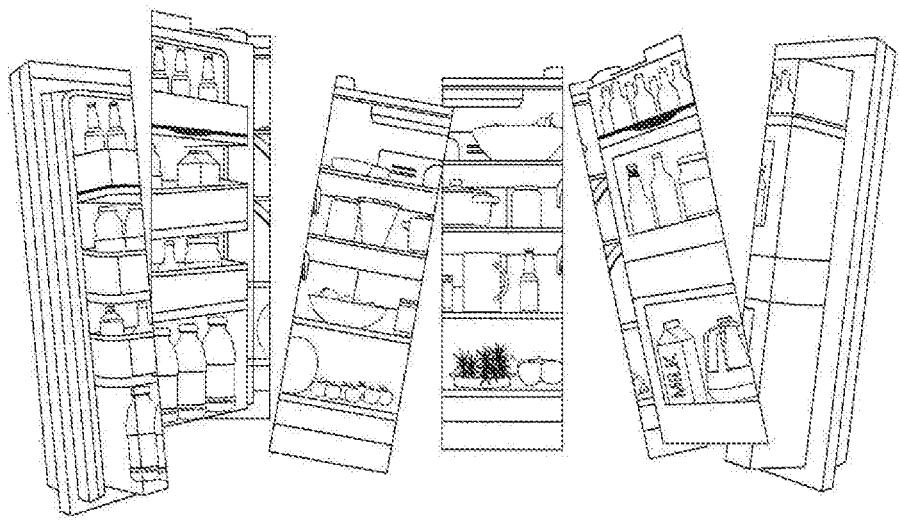
FIG. 7 illustrates an exemplary plurality of pictures of an interior of the refrigerator shown in FIG. 3.

FIG. 7 illustrates a plurality of pictures taken by the first camera 40 and the second camera 60 as the doors 30, 50 rotate. For example, in FIG. 7, the three left pictures may be taken by the first camera 40 and three right pictures may be taken by the second camera 60, and the six pictures taken by the first camera 40 and the second camera 60 may be combined with one another by the controller 80.

Alternatively, instead of three pictures, each of the first camera 40 and the second camera 60 may take four or more pictures, or one or two pictures. That is, a number of pictures taken by the first camera 40 and the second camera 60 may be controlled by controlling picture taking positions and the number of picture taking times of the first camera 40 and the second camera 60.

Figure 8:
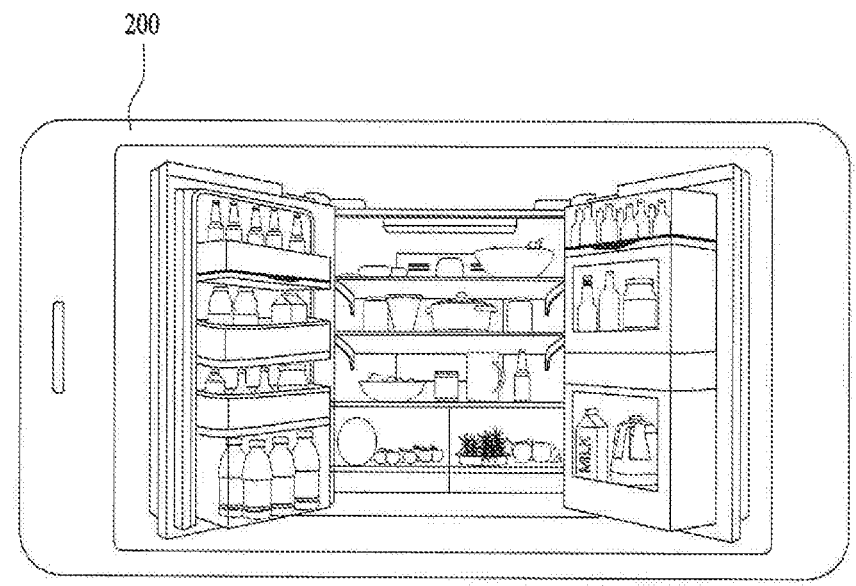
FIG. 8 illustrates the pictures of FIG. 7 corrected and transmitted to a terminal.

FIG. 8 is a front view of a terminal 200 displaying the pictures of FIG. 7 which have been corrected and transmitted to the terminal 200. Although FIG. 8 illustrates the corrected/combined image display on the terminal 200, the same information may be transmitted to the display 120.

In this case, the image contains content related to the interior of the first storage compartment 20. That is, the image may sequentially show, starting from the left side, the interior of the left door 50, the interior of the first storage compartment 20, and the interior of the right door 30. The image may be shown as if the right door 30 and the left door 50 are open and exposed to the user, so that the image displayed on the screen appears as if the user directly opens the right door 30 and the left door 50, and the user may intuitively and easily recognize information related to food stored in the refrigerator.

The image may be a single panoramic picture. That is, the single picture may prevent an unnecessary increase in photo capacity when the picture is transmitted to the user.

The user may recognize information related to the state, type, and amount of food stored in the first storage compartment 20 by simply viewing the image. Accordingly, it may be unnecessary to frequently open the right door 30 and/or the left door 50 of the refrigerator 100, and energy consumption may be reduced by preventing leakage from cold air of the first storage compartment 20 due to opening of the right door 30 and/or the left door 50. In addition, when the user is away from home, the user may determine food to be purchased and food not to be purchased using the image. Accordingly, waste of food due to repeated purchase and inconvenience caused when not purchasing necessary food may be prevented.

Figure 9:
FIG. 9 is an exemplary implementation of the combined picture shown in FIG. 8.

FIG. 9 illustrates an exemplary implementation example, in which the exemplary image shown in FIG. 8 may be processed to provide the user with a shopping list of items that the user needs to purchase. The shopping list of items may be produced and managed by the user as information related to food is directly extracted from the image, or as the user extracts information related to food and additionally inputs and manages the information.

Figure 10:
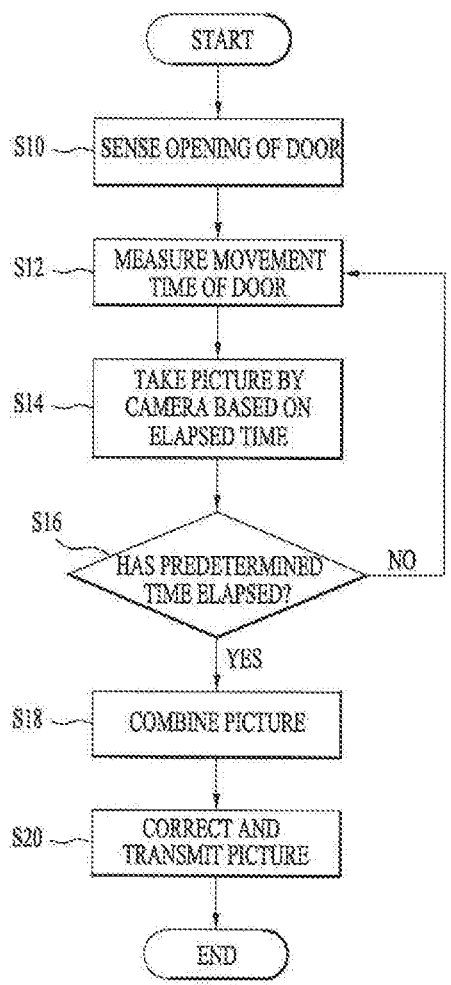
FIG. 10 is a flowchart of a picture taking process based on an elapsed open time of a door, in accordance with an embodiment as broadly described herein.

FIG. 10 is a flowchart of a picture taking process based on an elapsed time when a door is open, according to one embodiment as broadly described herein.

First, the door opening/closing sensor 150 may sense opening or closing of the door (S10).

Next, the timer 140 measures movement time of the door, beginning when the door opening/closing sensor 150 senses the opening or closing of the door (S12). The timer 140 may measure an elapsed time starting from a moment when the door begins to be opened. Assuming that the door is rotated at a constant angular velocity by the door rotation drive device 10, a rotation position of the door may be easily determined from the elapsed time.

Even if the door is not driven by the door rotation drive device 10, a rotation position of the door based on an elapsed time may be predicted by calculating an average angular velocity of the refrigerator door during a typical manual rotation of the door.

The camera takes a picture based on the elapsed time measured by the timer 140 (S14). Since the first camera 40 and the second camera 60 are rotated along with the door, positions of the first camera 40 and the second camera 60 vary as time passes. Accordingly, the first camera 40 and the second camera 60 may take different pictures as time passes.

Then, it is determined whether or not a predetermined time, as measured by the timer 140, has elapsed (S16). The predetermined time may be, for example, an amount of time for the door to rotate to a fully open or fully closed position. If the predetermined time has not elapsed and there remains time for the first camera 40 and the second camera 60 to make additional pictures, movement time of the door is continuously measured (S12).

On the other hand, if the predetermined time has elapsed, it may be recognized that the first camera 40 and the second camera 60 have taken all pictures necessary. That is, the first camera 40 and the second camera 60 are no longer taking pictures.

Next, the controller 80 combines the pictures taken by the first camera 40 and the second camera 60 (S18). FIG. 7 shows one example of the plurality of pictures taken by the first camera 40 and the second camera.

Then, the controller 80 may correct the plurality of combined pictures into an image as shown in FIG. 8, and transmit the corrected image to the display 120 or to the terminal 200 via the communication device 84 (S20).

Figure 11:
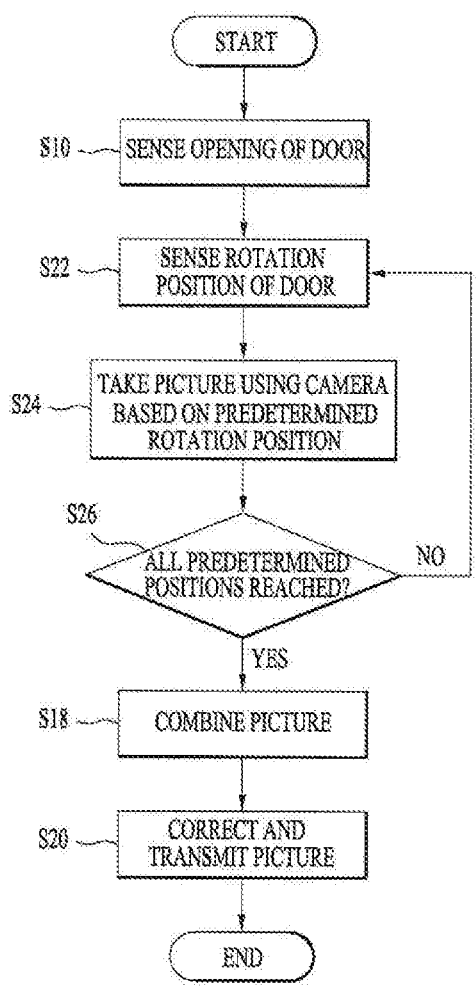
FIG. 11 is a flowchart of a picture taking process based on a rotation position of a door when the door is open, in accordance with an embodiment as broadly described herein.

FIG. 11 is a flowchart of a picture taking process based on a rotation position of the door when the door is open, according to one embodiment as broadly described herein. In FIG. 11, instead of the time measured by the timer 140, the first camera 40 and the second camera 60 may take a picture based on a rotation position of the right door 30 and a rotation position of the left door 50. For convenience of explanation, parts different from those of FIG. 10 will be described, and a description related to the same or similar parts will be omitted hereinafter.

When opening of the door is sensed (S10), the door rotation position sensor 130 senses a rotation position of the right door 30 and a rotation position of the left door 50 (S22).

When the right door 30 and the left door 50 reach predetermined rotation positions, the first camera 40 and the second camera 60 take a picture (S24). Since a plurality of rotation positions may be predetermined, the first camera 40 and the second camera 60 may take a plurality of pictures.

Then, it is determined whether or not the right door 30 and the left door 50 reach all predetermined rotation positions (S26). That is, in the case in which the predetermined rotation positions are set to positions where the door is rotated by, for example, 40 degrees, 65 degrees, and 90 degrees with respect to the main body 100a, it may be determined whether or not the doors have reached all positions corresponding to the respective angles.

If it is determined that the right door 30 and the left door 50 have reached all the predetermined rotation positions, the door rotation position sensor 130 may continuously sense a rotation position of the right door 30 and a rotation position of the left door 50.

If it is determined that the right door 30 and the left door 50 have reached all the predetermined rotation positions, the controller 80 may combine a plurality of pictures (S18).

Figure 12:
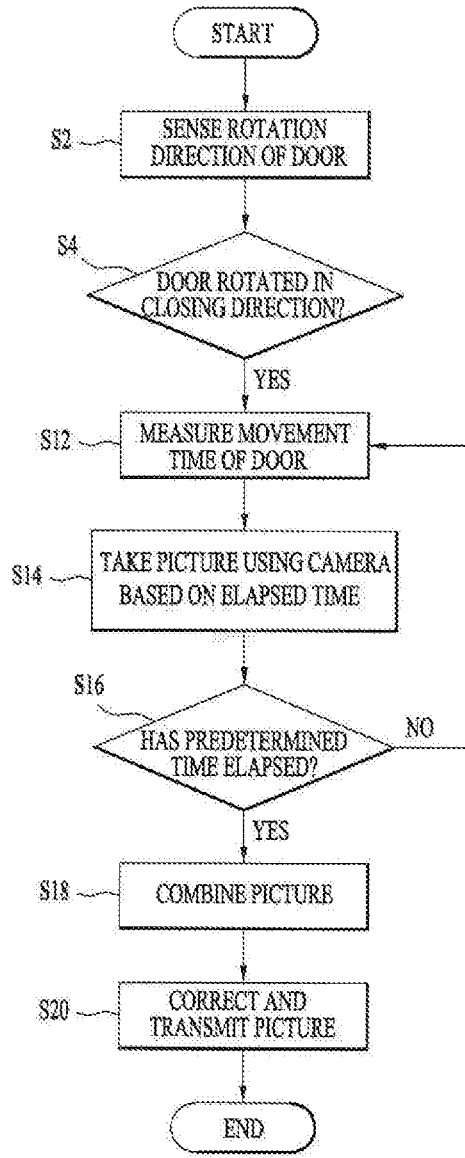
FIG. 12 is a flowchart of a picture taking process based on an elapsed time when a door is closed, in accordance with an embodiment as broadly described herein.

FIG. 12 is a flowchart of a picture taking process based on an elapsed time when the door is closed, according to one embodiment as broadly described herein. In particular, FIG. 12 explains a picture taking process of the first camera 40 and the second camera 60 when the door is rotated in a direction to close the first storage compartment 20, differently from that of FIG. 10. Accordingly, parts different from those of FIG. 10 will be described, and a description related to the same parts will be omitted hereinafter.

First, the door rotation direction sensor 160 may sense a rotation direction of the right door 30 and a rotation direction of the left door 50 (S2).

If it is determined that the right door 30 and the left door 50 are rotated in a direction to close the first storage compartment 20 (S4), movement time of the door may be measured to allow the first camera 40 and the second camera 60 to take a picture.

If it is determined that the right door 30 and the left door 50 are rotated in a direction to open the first storage compartment 20, the first camera 40 and the second camera 60 may take a picture in the same manner as the above description with reference to FIG. 10.

Figure 13:
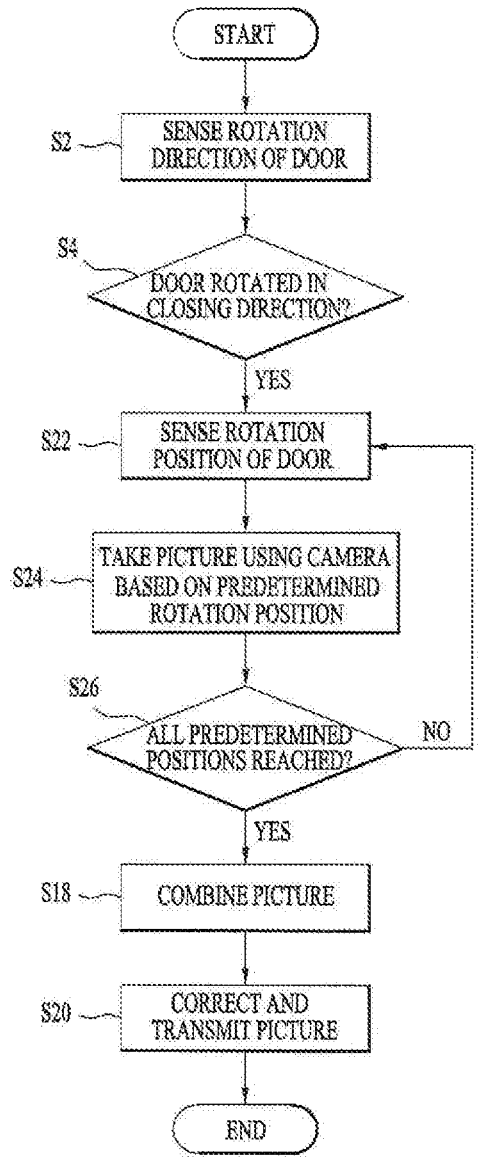
FIG. 13 is a flowchart of a picture taking process based on a rotation position of a door when the door is closed, in accordance with an embodiment as broadly described herein.

FIG. 13 is a flowchart of a picture taking process based on a rotation position of a door when the door is closed, according to one embodiment as broadly described herein. With reference to FIG. 13, a picture taking method of the first camera 40 and the second camera 60 when the door is rotated in a direction to close the first storage compartment 20 will be described. Accordingly, although the process of FIG. 13 is similar to that of FIG. 12, there is a difference in that the first camera 40 and the second camera 60 take a picture via sensing of a rotation position of the door.

That is, in the same manner as the above description with reference to FIG. 12, the door rotation direction sensor 160 may sense that the right door 30 and the left door 50 are rotated in a direction to close the first storage compartment 20 (S2, S4).

Then, if it is determined that the right door 30 and the left door 50 are closing the first storage compartment 20, the first camera 40 and the second camera 60 may take a picture when the right door 30 and the left door 50 reach predetermined rotation positions thereof (S22, S24).

Figure 14:
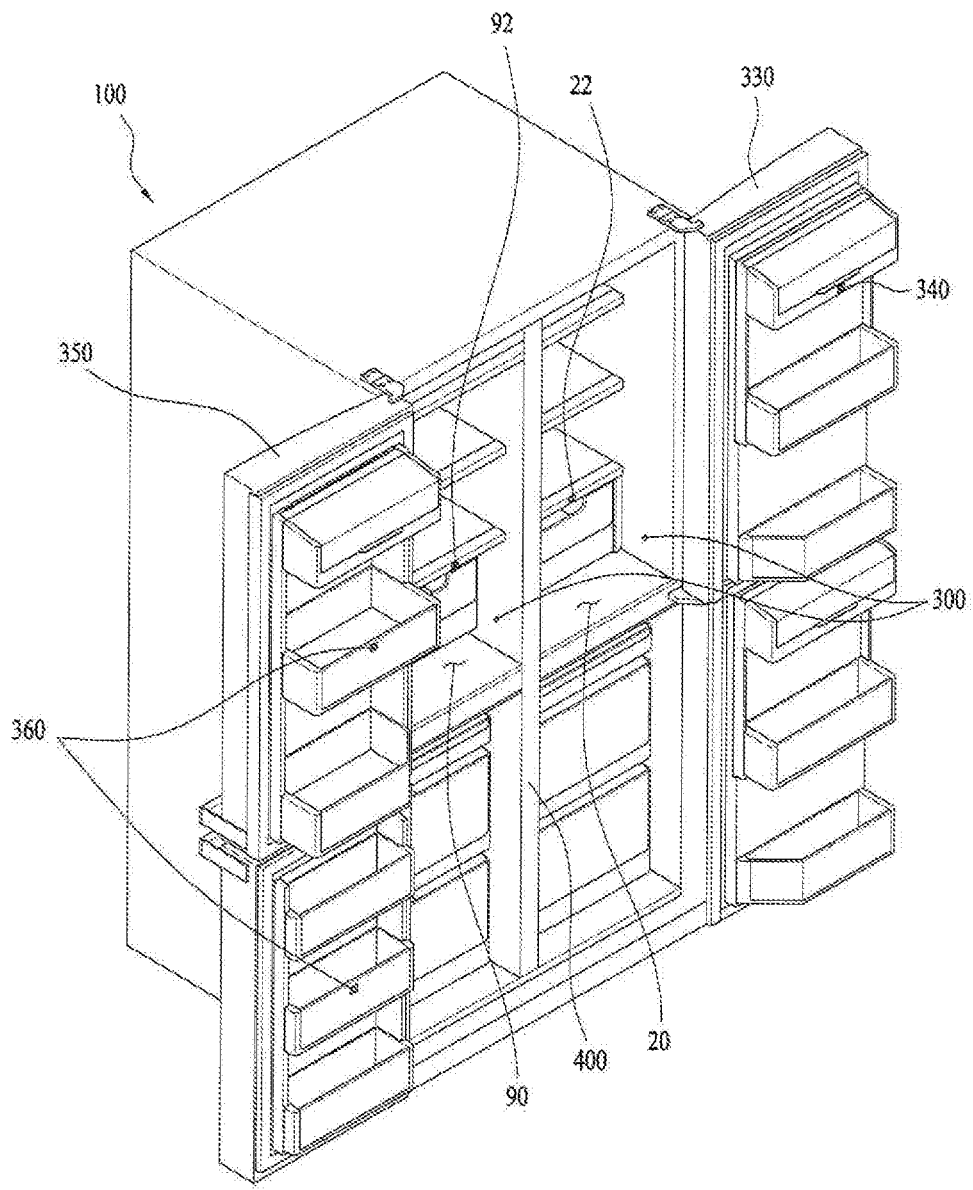
FIG. 14 is a perspective view of a refrigerator, in accordance with another embodiment as broadly described herein.
Figure 15:
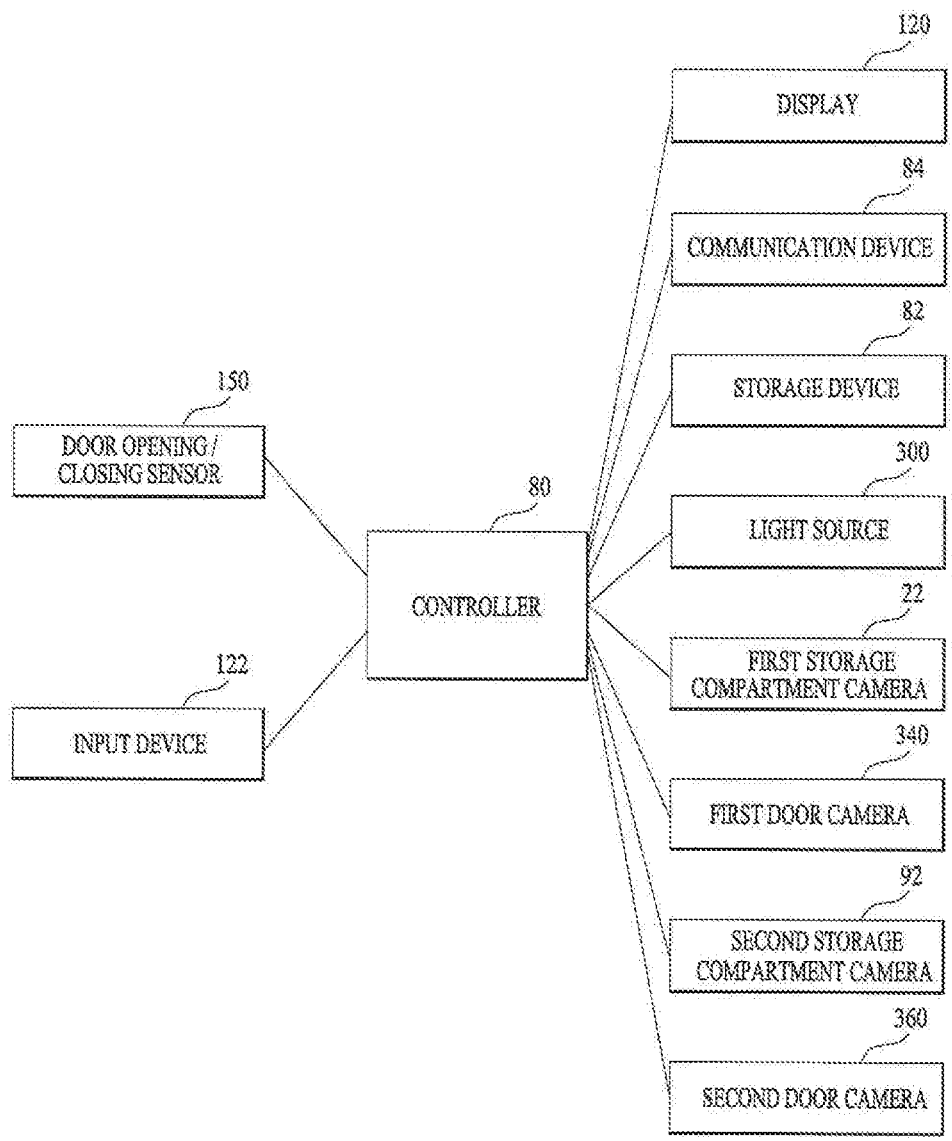
FIG. 15 is a control block diagram for the refrigerator shown in FIG. 14.

FIG. 14 is a perspective view of a refrigerator according to another embodiment as broadly described herein, and FIG. 15 is a control block diagram of the refrigerator shown in FIG. 14. In this embodiment, the same parts as those of the previously described embodiment are designated by the same reference numerals, and a description related to the same parts will be omitted hereinafter.

In this embodiment, the first storage compartment 20 and the second storage compartment 90 may define separate spaces divided by a barrier 400 which is vertically installed in the main body 100a. In this case, each of the first storage compartment 20 and the second storage compartment 90 may provide a space in which food is stored, and may serve as a refrigerating compartment or a freezing compartment.

The first storage compartment 20 may be open or closed by a first door 330, and the second storage compartment 90 may be open or closed by a second door 350. The first door 330 and the second door 350 may be rotated relative to the main body 100a.

The first storage compartment 20 may be provided with a first storage compartment camera 22, and the second storage compartment 90 may be provided with a second storage compartment camera 92. The first storage compartment camera 22 may take a picture of the interior of the first door 330, and the second storage compartment camera 92 may take a picture of the interior of the second door 350. That is, the first storage compartment camera 22 is arranged to take a picture of food stored in the first door 330, and the second storage compartment camera 92 is arranged to take a picture of food stored in the second door 350.

The first door 330 and the second door 350 may each be provided with door cameras. The first door 330 may be provided with a first door camera 340 and the second door 350 may be provided with a second door camera 360. The first door camera 340 may take a picture of the first storage compartment 20, and the second door camera 360 may take a picture of the second storage compartment 90. That is, the first door camera 340 is arranged to take a picture of food stored in the first storage compartment 20, and the second door camera 360 is arranged to take a picture of food stored in the second storage compartment 90.

The refrigerator 100 may include a light source 300 installed in the main body 100a to emit light. The light source 300 may emit light to allow the user to view food stored in the first storage compartment 20 or the second storage compartment 90 when the user opens the first door 330 or the second door 350. That is, the light source 300 may be driven when the door opening/closing sensor 150 senses opening of the first door 330 and/or the second door 350 and the first door 330 and/or the second door 350 is open.

In addition, the light source 300 may be driven when the user tries to check food stored in the first storage compartment 20 and the second storage compartment 90 as well as food stored in the first door 330 and the second door 350. That is, even in a state in which the first door 330 and the second door 350 close the first storage compartment 20 and the second storage compartment 90, the light source 300 may be driven. Once the light source 300 is driven, the first storage compartment camera 22, the second storage compartment camera 92, the first door camera 340, and the second door camera 360 may take a picture.

The door opening/closing sensor 150 may determine that the first door 330 or the second door 350 closes the first storage compartment 20 or the second storage compartment 90 respectively. In this case, the light source 300 may be driven, and the first storage compartment camera 22, the second storage compartment camera 92, the first door camera 340, and the second door camera 360 may take a picture.

In a closed state of the first door 330 and the second door 350, the interior of the first storage compartment 20 and the second storage compartment 90 is dark, and therefore a picture containing information with desired resolution cannot be taken. To solve this problem, the light source 300 may be driven with the first door 330 and the second door 350 closed.

Each of the first storage compartment camera 22, the second storage compartment camera 92, the first door camera 340, and the second door camera 360 may be provided in plurality. In this case, each of the plurality of first storage compartment cameras 22, the second storage compartment cameras 92, the first door cameras 340, and the second door cameras 360 may be arranged in a line or in a plurality of lines to simultaneously take a plurality of pictures.

Figure 16:
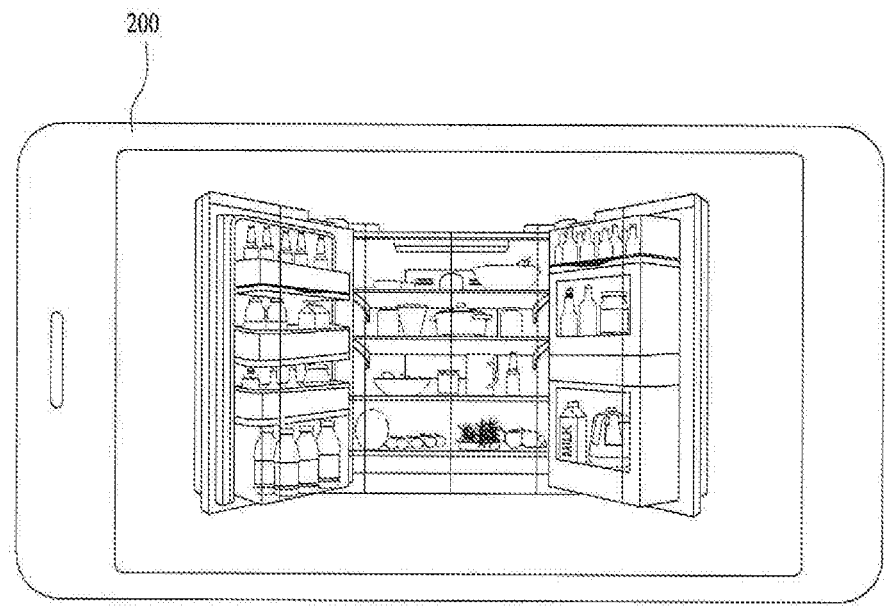
FIG. 16 illustrates a plurality of pictures corrected into a single picture and transmitted to a terminal, in accordance with another embodiment as broadly described herein.

The controller 80 may combine and correct pictures taken by the first storage compartment camera 22, the second storage compartment camera 92, the first door camera 340, and the second door camera 360. An image combined and corrected by the controller 80 may be transmitted to the user terminal 200. For example, an image as shown in FIG. 16 may be transmitted to the user terminal 200.

The image sequentially shows, starting from the left side, the interior of the second door 350, the interior of the second storage compartment 90, the interior of the first storage compartment 20, and the interior of the first door 330. That is, the image shows a state in which the first door 330 and the second door 350 are fully open, and therefore the user may intuitively recognize information related to the type, state, and amount of food stored in the refrigerator 100 from the image.

Thus, the user may acquire information related to food stored in the refrigerator 100 without opening the first door 330 and/or the second door 350. In addition, differently from the previously described embodiment, information related to the interior of the refrigerator 100 may be acquired from pictures taken in a closed state of the first door 330 and the second door 350.

Figure 17:
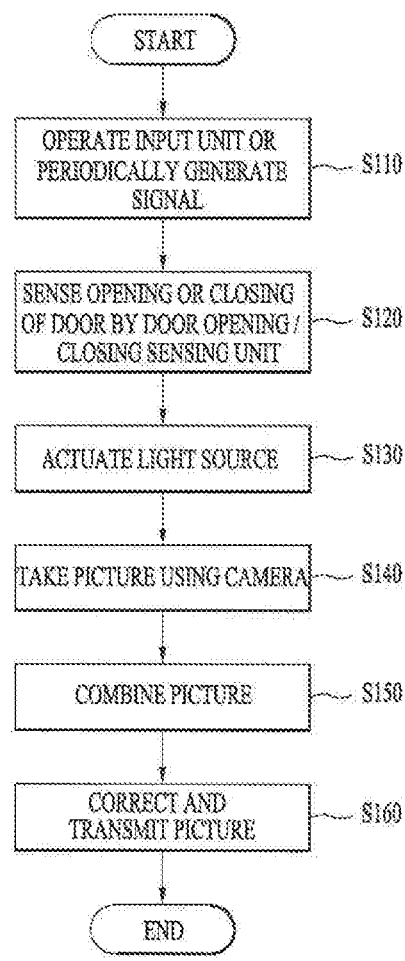
FIG. 17 is a flowchart, in accordance with another embodiment as broadly described herein.

FIG. 17 is a flowchart according to another embodiment as broadly described herein.

The user may operate the input device 122, or generation of a signal at a prescribed interval may be set (S110). In this case, the user may acquire information related to food stored in the refrigerator by operating the input device 122 or based on periodically generated signals.

In response to a signal to instruct the camera to take a picture, the door opening/closing sensor 150 may sense opening or closing of the first door 330 or the second door 350.

If it is determined that the first door 330 or the second door 350 is closed, the light source 300 is actuated (S130), because the first storage compartment 20 and the second storage compartment 90 are dark when the first door 330 and the second door 350 are closed.

Once the light source 300 is actuated, the first storage compartment 20 and the second storage compartment 90 have sufficient luminance, and the first door camera 340, the second door camera 360, the first storage compartment camera 22, and the second storage compartment camera 92 may be operated to take a picture (S140).

Since the first door camera 340, the second door camera 360, the first storage compartment camera 22, and the second storage compartment camera 92 are kept stationary, each camera may take a picture only one time, because the same picture is acquired in a stationary state of the camera, even if the camera takes a plurality of pictures.

The controller 80 combines pictures taken by the first door camera 340, the second door camera 360, the first storage compartment camera 22, and the second storage compartment camera 92 with one another (S150).

Then, the controller 80 may correct the combined pictures into an image, and transmit the corrected image to the display 120 or the terminal 200 via the communication device 84 (S160).

The corrected image may be stored in the storage device 82, which enables history management of respective images.

Figure 18:
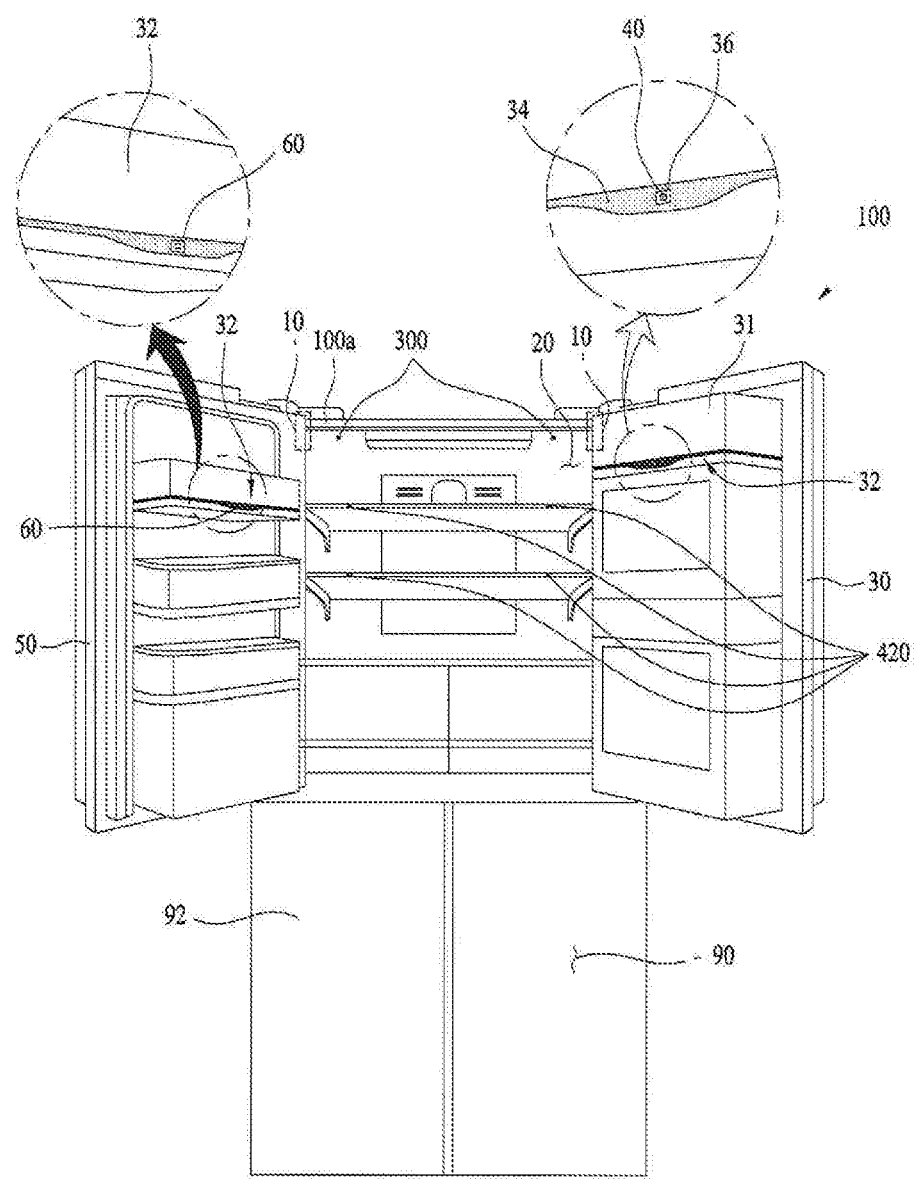
FIG. 18 is a front view of a refrigerator, in accordance with another embodiment as broadly described herein.
Figure 19:
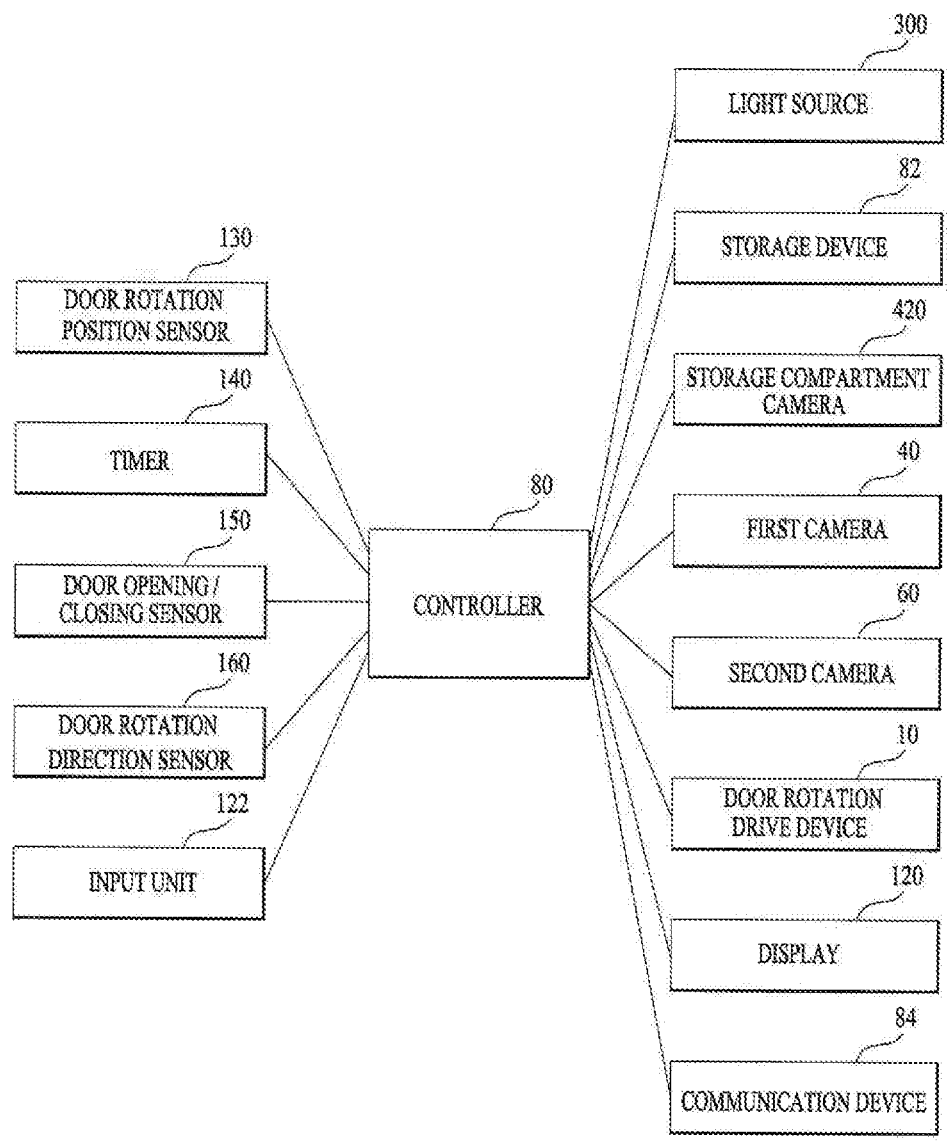
FIG. 19 is a control block diagram of the refrigerator shown in FIG. 18.

FIG. 18 is a front view of a refrigerator according to another embodiment as broadly described herein, and FIG. 19 is a control block diagram of the refrigerator shown in FIG. 18.

This embodiment may be applied to a refrigerator having a configuration as described above with respect to FIG. 13, and may employ a combined picture taking method including picture taking method described with respect to the embodiment shown in FIG. 3 and the embodiment shown in FIG. 14. That is, a further embodiment may be applied to the refrigerator having a configuration as shown in FIG. 3. In addition, information related to food stored in a refrigerating compartment or a freezing compartment may be acquired even in a closed state of the door, similar to that in the embodiment shown in FIG. 14.

This embodiment is a combination of the embodiment described with respect to FIG. 3 and the embodiment described with respect to FIG. 14, and thus a detailed description related to respective components will be omitted hereinafter. However, it will be appreciated that the components according to this embodiment perform the same function as the above-described components, and thus the above description may be equally applied.

According to this embodiment, in addition to the first camera 40 installed at the right door 30 and the second camera 60 installed at the left door 50, a storage compartment camera 420 may be installed to take a picture of the interior of the right door 30 and the interior of the left door 50. In certain embodiments, a plurality of storage compartment cameras 420 may be arranged in plural lines.

More specifically, as shown in FIG. 6, the right door 30 and the left door 50 are pivotally rotated to allow the first camera 40 and the second camera 60 to take a picture, which may result in generation of an image as shown in FIG. 8. In this case, the image may sequentially show, starting from the left side, the interior of the left door 50 for the first storage compartment, the interior of the first storage compartment 20, and the interior of the right door 30 for the first storage compartment.

In addition, the light source 300 may be actuated as described above with reference to FIG. 16, and the storage compartment camera 420, the first camera 40 and the second camera 60 may be driven to take a picture, which may result in generation of an image as shown in FIG. 8.

In this embodiment, the user may acquire information related to food stored in the refrigerator 100 based on pictures taken via pivotal rotation of the door. In addition, the user may also acquire information related to food stored in the refrigerator 100 even in a state in which the storage compartment is closed by the doors.

In a refrigerator as embodied and broadly described herein, a user may recognize information related to items stored in a refrigerator without opening a door of a storage compartment of the refrigerator.

In a refrigerator as embodied and broadly described herein, even when the user is away from home, the user may recognize information related to items stored in the refrigerator via a portable terminal.

In a refrigerator as embodied and broadly described herein, the user may view a display of an interior of the refrigerator similar to that when a refrigerator door is directly opened, which assists the user in easily recognizing the interior state of the refrigerator.

A refrigerator as embodied and broadly described herein may provide a user with information related to items stored in the refrigerator.

A refrigerator as embodied and broadly described herein may provide a user with an image as if the user opens the refrigerator.

A refrigerator, as embodied and broadly described herein, may include a main body having a first storage compartment in which food is stored, a right door for the first storage compartment, the right door being installed to a right side of the main body to open the first storage compartment via pivotal rotation thereof about the right side of the first storage compartment, a left door for the first storage compartment, the left door being installed to a left side of the main body to open the first storage compartment via pivotal rotation thereof about the left side of the first storage compartment, a first camera installed to the right door for the first storage compartment, the first camera taking a picture during rotation of the right door for the first storage compartment, a second camera installed to the left door for the first storage compartment, the second camera taking a picture during rotation of the left door for the first storage compartment, and a control unit configured to combine a plurality of pictures taken by the first camera and the second camera with one another and correct the pictures into an image showing a region from the right door for the first storage compartment to the left door for the first storage compartment.

The refrigerator may further include a door rotation position sensing unit configured to sense a rotation position of the left door for the first storage compartment or the right door for the first storage compartment.

The control unit may instruct the first camera or the second camera to take a picture when the right door for the first storage compartment or the left door for the first storage compartment reaches a predetermined rotation position.

The first camera or the second camera may take a picture at least one time or more when the right door for the first storage compartment or the left door for the first storage compartment is rotated relative to the main body by an angle less than 90 degrees.

The first camera or the second camera may be installed to an inner side of each door.

The first camera may take a picture of a left region of the first storage compartment and the second camera may take a picture of a right region of the first storage compartment.

The image may sequentially show, starting from the left side, the interior of the left door for the first storage compartment, the interior of the first storage compartment, and the interior of the right door for the first storage compartment.

The refrigerator may further include a door rotation drive unit configured to rotate the right door for the first storage compartment or the left door for the first storage compartment.

The first camera or the second camera may begin to take a picture when the right door for the first storage compartment or the left door for the first storage compartment is rotated in a direction perpendicular to the main body to close the first storage compartment.

The refrigerator may further include a door opening/closing sensing unit configured to sense opening or closing of the right door for the first storage compartment or the left door for the first storage compartment.

The first camera or the second camera may take a picture based on an elapsed time when the right door for the first storage compartment or the left door for the first storage compartment is rotated to open the first storage compartment.

The refrigerator may further include a door rotation direction sensing unit configured to sense a rotation direction of the right door for the first storage compartment or the left door for the first storage compartment.

The first camera or the second camera may take a picture when the door rotation direction sensing unit senses that the right door for the first storage compartment or the left door for the first storage compartment is rotated in a set direction.

The set direction may be a door rotation direction to close the first storage compartment.

The refrigerator may further include a communication unit configured to transmit the image to an external device.

The refrigerator may further include a display unit configured to show the image to the user.

The refrigerator may further include a storage unit configured to store the last image corrected by the control unit, and a communication unit configured to transmit the last image stored in the storage unit to an external device.

In accordance with another embodiment as broadly described herein, a refrigerator may include a main body having a storage compartment in which food is stored, a door configured to open or close the storage compartment, a storage compartment camera installed in the storage compartment, a door camera installed to the door, and a control unit configured to combine a plurality of pictures taken by the storage compartment camera and the door camera with one another and correct the pictures into an image showing the door and the storage compartment.

The refrigerator may further include a door opening/closing sensing unit configured to sense opening or closing of the door.

The storage compartment camera and the door camera may take a picture when the door opening/closing sensing unit senses that the door closes the storage compartment.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator, comprising:
a main body having a storage compartment;
a door rotatably coupled to an end portion of the main body, the door having baskets to store food and to be arranged on an inner surface of the door;
a plurality of cameras provided at the baskets and configured to take at least one picture, the cameras arranged in only a row;
a light source provided on the storage compartment;
a door opening/closing sensor; and
a controller configured to actuate the light source and to control the cameras to take the pictures of the storage compartment when the door opening/closing sensor detects that the door closes the storage compartment,
wherein the cameras are located on a middle portion of the storage compartment in a width direction, and
wherein the cameras take photos simultaneously.

2. The refrigerator according to claim 1, wherein the cameras have one of cameras arranged on a upper portion and the other of cameras arranged on a lower portion.

3. The refrigerator according to claim 1, wherein the cameras takes photos when the light source is operated.

4. The refrigerator according to claim 1, wherein the controller combines a plurality of pictures taken by the cameras simultaneously.

5. The refrigerator according to claim 1, further comprising:
a decorative portion provided on the door,
wherein the camera is arranged to the decorative portion.

6. The refrigerator according to claim 5, wherein the decorative portion is formed of an opaque material, and the decorative portion has a transparent window at the middle portion of the decorative portion.

7. The refrigerator according to claim 1, further comprising:
a storage device configured to store the pictures taken by the cameras; and
a communication device configured to transmit the pictures stored in the storage device to an external device.

8. The refrigerator according to claim 7, wherein the storage device stores the picture combined by the controller.

9. The refrigerator according to claim 7, wherein the communication device transmits the last pictures taken by the cameras to the external device.

10. The refrigerator according to claim 7, wherein the communication device transmits the pictures when the controller receives a user's request signal.

11. The refrigerator according to claim 7, wherein the external device includes a terminal having a display that displays the picture.

12. The refrigerator according to claim 11, wherein the terminal is connected to the refrigerator through a network.

13. The refrigerator according to claim 1, wherein the storage compartment includes a refrigerating compartment, and wherein the door opens and closes the refrigerating compartment.

14. The refrigerator according to claim 1, wherein a plurality of racks is provided in the storage compartment.

* * * * *